United States Patent [19]

Medcalf, Jr.

[11] Patent Number: 5,695,030
[45] Date of Patent: Dec. 9, 1997

[54] PARK MECHANISM FOR AUTOMOTIVE TRANSMISSION

[75] Inventor: William E. Medcalf, Jr., Evanston, Ill.

[73] Assignee: Applied Kinetics Corporation, Evanston, Ill.

[21] Appl. No.: 543,551

[22] Filed: Oct. 16, 1995

[51] Int. Cl.⁶ ............................ B60K 41/26; F16D 65/14
[52] U.S. Cl. ......................... 192/4 A; 74/411.5; 188/31; 188/170
[58] Field of Search ........................ 74/411.5; 188/31, 188/170; 192/69.62, 69.71, 69.9, 4 A

[56] References Cited

U.S. PATENT DOCUMENTS

| | | |
|---|---|---|
| 1,532,868 | 4/1925 | Blackburn . |
| 1,711,929 | 5/1929 | Druhe . |
| 1,799,708 | 4/1931 | Scherrer .................. 192/4 A |
| 2,672,203 | 3/1954 | Brown ................... 192/4 A X |
| 2,747,430 | 5/1956 | Förster et al. . |
| 2,926,737 | 3/1960 | Fischer .................. 192/4 A X |
| 2,984,318 | 5/1961 | Mathews .................. 188/31 |
| 3,020,781 | 2/1962 | Burtnett . |
| 3,034,619 | 5/1962 | Glasgow et al. . |
| 3,038,574 | 6/1962 | Roche . |
| 3,102,619 | 9/1963 | Tiedemann . |
| 3,500,970 | 3/1970 | Schilling ................... 188/170 |
| 3,526,302 | 9/1970 | Grant et al. ................ 188/170 |
| 3,631,947 | 1/1972 | Laing . |
| 3,700,080 | 10/1972 | Delorean .................. 192/4 A |
| 3,763,975 | 10/1973 | Fontaine . |
| 3,770,085 | 11/1973 | Cottingham .......... 188/170 X |
| 3,905,457 | 9/1975 | Shea . |
| 3,948,361 | 4/1976 | Carlson . |
| 3,977,272 | 8/1976 | Neumann . |
| 3,977,732 | 8/1976 | Grosseau . |
| 3,999,075 | 12/1976 | Johnson et al. . |
| 4,041,798 | 8/1977 | Shinozaki et al. . |
| 4,195,716 | 4/1980 | Wirt . |
| 4,223,570 | 9/1980 | Yamamori et al. . |
| 4,245,724 | 1/1981 | Beck . |
| 4,254,845 | 3/1981 | Braun . |
| 4,432,585 | 2/1984 | Nezuka . |
| 4,438,663 | 3/1984 | Eichenberger et al. . |
| 4,454,936 | 6/1984 | Wise . |
| 4,509,624 | 4/1985 | Barr . |
| 4,518,066 | 5/1985 | Barr . |
| 4,645,039 | 2/1987 | Lewis et al. ............... 188/170 X |
| 4,645,046 | 2/1987 | Takano et al. . |
| 4,651,577 | 3/1987 | Iwase et al. . |
| 4,667,527 | 5/1987 | Ehrlinger et al. ............ 74/411.1 |
| 4,722,427 | 2/1988 | Prumbaum et al. . |
| 4,749,236 | 6/1988 | Graham . |
| 4,771,852 | 9/1988 | Nishikawa et al. . |
| 4,807,492 | 2/1989 | Moroto et al. . |
| 4,856,622 | 8/1989 | Sartain et al. . |

(List continued on next page.)

OTHER PUBLICATIONS

1989 Grand Am Service Manual Pontiac Division, General Motors Corp. (1989).
Ford Taurus/Sable Body/Chassis/Electrical/Powertrain Service Manual Ford Motor Co. (1992).
Sabuaru 1989 Service Manual, Fuji Heavy Industries Ltd. (1989).

*Primary Examiner*—Rodney H. Bonck
*Attorney, Agent, or Firm*—Wigman, Cohen, Leitner & Myers, P.C.

[57] ABSTRACT

A park mechanism for an automotive transmission having an output shaft comprises a rotatable lock ring structure connected to the output shaft, a non-rotatable lock ring structure positioned in proximity to the rotatable lock ring structure, and a pressure mechanism (preferably, including a spring-biased piston within a pressure chamber) responsive to application of pressure thereto for moving the non-rotatable lock ring structure to a disengaged position for non-engagement with the rotatable lock ring structure, and responsive to the release of pressure therefrom for moving the non-rotatable lock ring structure to an engaged position for engagement with the rotatable lock ring structure. Preferably, the rotatable lock ring structure is provided with at least one receptacle or tooth, and the non-rotatable lock ring structure is provided with at least one tooth receivable in the receptacle or tooth.

12 Claims, 1 Drawing Sheet

U.S. PATENT DOCUMENTS

| | | |
|---|---|---|
| 4,879,925 | 11/1989 | Taga et al. . |
| 4,893,879 | 1/1990 | Middelhoven et al. . |
| 4,899,621 | 2/1990 | Sakakibara . |
| 4,923,254 | 5/1990 | Molen et al. . |
| 4,930,610 | 6/1990 | Akai et al. . |
| 4,979,783 | 12/1990 | Johnson . |
| 4,989,703 | 2/1991 | Forsyth et al. . |
| 5,046,997 | 9/1991 | Koivunen . |
| 5,069,657 | 12/1991 | Taniguchi et al. . |
| 5,085,102 | 2/1992 | Iwase et al. . |
| 5,092,437 | 3/1992 | Maier . |
| 5,179,868 | 1/1993 | Thibeault . |
| 5,183,138 | 2/1993 | Jolliff . |
| 5,203,616 | 4/1993 | Johnson . |
| 5,269,195 | 12/1993 | Kitagawara . |
| 5,295,412 | 3/1994 | Donato et al. . |
| 5,348,518 | 9/1994 | Taniguchi et al. . |
| 5,365,804 | 11/1994 | Downs et al. . |
| 5,366,053 | 11/1994 | Yant . |
| 5,381,878 | 1/1995 | Ohshima et al. . |
| 5,389,047 | 2/1995 | Akiyama . |
| 5,397,282 | 3/1995 | Weidman . |
| 5,404,975 | 4/1995 | Michel . |
| 5,429,212 | 7/1995 | Schlosser ............................ 188/31 X |

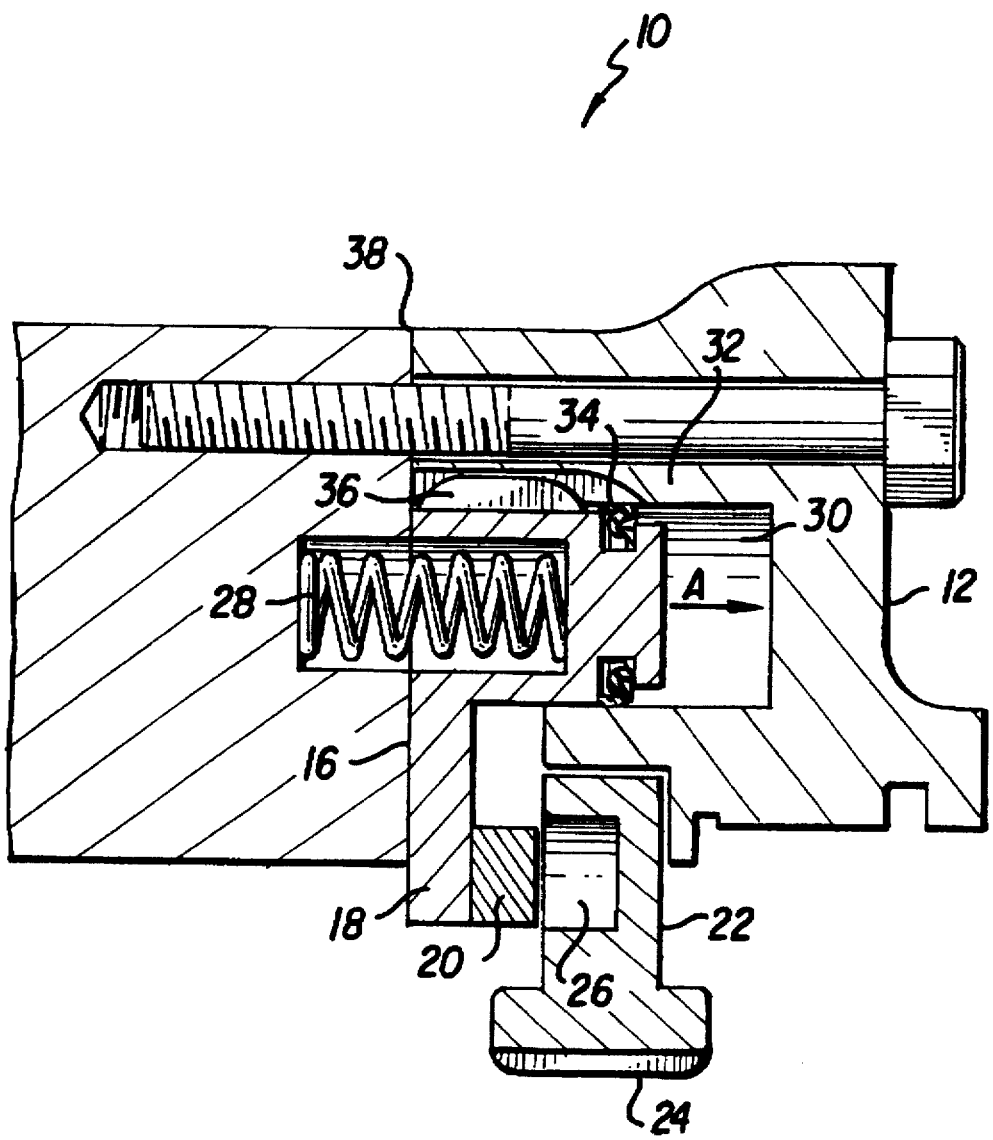

PARK MECHANISM FOR AUTOMOTIVE TRANSMISSION

TECHNICAL FIELD

The present invention generally relates to a park mechanism for an automotive transmission, and more particularly to an annular parking gear structure which is coextensive with a drive-train output shaft of an automotive transmission. More particularly, an annular lock ring is spring-biased into engagement with receptacles or teeth of a rotatable lock ring structure, but a hydraulic or other fluid pressure system returns the annular lock ring to a disengaged position during vehicle operation by directing fluid pressure against one or more pistons formed in the lock ring and received in hydraulic chamber(s) provided in the transmission case.

BACKGROUND ART

Many systems have been developed in the prior art to prevent inadvertent vehicle motion when the vehicle is parked. Preventing motion of the vehicle requires that torque be applied to the driveline(s). The required torque increases as either the vehicle weight or the surface slope, or both, increase. Torque can be provided by a friction brake or by a mechanism which locks the driveshaft to the frame of the vehicle. The effectiveness of the friction brake depends upon park brake actuation by the driver, and proper adjustment and condition of the brake. Locking of the drive line to the frame can be accomplished by locking the transmission output shaft to the case or, under certain circumstances, by engine braking. Engine braking depends upon compression ratio, overall gear ratio, and direct coupling of the driveline with the engine, which is not provided by the torque converter of an automatic transmission.

Historically, and up to the present day, effective use of the park brake remains problematic. Driver actuation is a "sometime" thing in that, when the brake is actuated, the applied force used is often inadequate. These conditions, combined with the increased usage of automatic transmissions, led to the development of, and codified requirement for, a "park" capability in automatic transmissions of passenger cars and light-duty trucks.

No manual transmission is equipped with a "park" capability or function. The recommended practice for parking vehicles equipped with manual transmissions is to set the parking brake, and place a transmission in either first or reverse gear. The primary anti-motion mechanism in such an arrangement is the brake. Engine compression, acting through the gear train, then becomes the secondary means of resisting motion. Throughout the world, passenger cars with automatic transmissions are equipped with a "park" feature or capability. Many, if not all, of such arrangements incorporate a pivoting pawl arrangement. Such arrangements are disclosed, for example, in 1989 *Grand Am Service Manual*, Pontiac Division, General Motors Corporation (1989); *Ford Taurus/Sable Body/Chassis/Electrical/Powertrain Service Manual*, Ford Motor Company (1992); and *Subaru* 1989 *Service Manual*, Fuji Heavy Industries Ltd. (1989).

In the latter designs, the torque required to resist rotation of the transmission output shaft results in a force ($F_n$), exerted through the bearing of the pawl "tooth" on the park gear. This results in a friction force ($F_f = \mu \times F_n$) which resists motion of the pawl tooth along the surface of the park gear tooth. Because $F_f$ is linear with vehicle weight, heavier vehicles require increased force to disengage the pawl tooth from the park gear. This condition has been recognized (for example, in U.S. Pat. No. 5,046,997-Koivunen), and it has been proposed to use hydraulic pressure, acting on a piston pushing an extension of the pawl lever, to assist in the disengagement of the park pawl tooth from the gear. If the angle of the teeth (park pawl and park gear) is designed to permit easier separation, then the separating force (when parked) must be resisted by the park application mechanism, requiring larger and more strongly supported sections and causing friction forces on the bearing surface between the back of the pawl lever and the application rod.

Increasing numbers of medium and heavy-duty trucks, as well as agricultural, construction and off-road equipment, use automatic and/or auto-shift manual transmissions. The transmissions in these vehicles are not equipped with a "park" feature or capability. The logic appears to have been that the forces required to disengage the "park" feature in such vehicles exceeds practical levels which can be developed through the shift linkage.

Thus, there is a need in the prior art for the development of a park mechanism for an automotive transmission, wherein fluid pressure is utilized to disengage pawl teeth from a locking position within a rotating lock ring structure, thereby permitting movement of the vehicle, and conversely wherein lack of fluid pressure is utilized to permit spring-biased engagement of pawl teeth, thereby preventing movement of the vehicle so long as it remains in the "park" position.

The following patents are considered to be representative of the prior art relative to the invention disclosed herein: U.S. Pat. Nos. 1,532,868; 1,711,929; 2,747,430; 3,020,781; 3,034,619; 3,038,574; 3,102,619; 3,63 1,947; 3,763,975; 3,905,457; 3,948,361; 3,977,272; 3,977,732; 3,999,075; 4,041,798; 4,195,716; 4,223,570; 4,245,724; 4,254,845; 4,432,585; 4,438,663; 4,454,936; 4,509,624; 4,518,066; 4,645,046; 4,651,577; 4,722,427; 4,749,236; 4,771,852; 4,807,492; 4,856,622; 4,879,925; 4,893,879; 4,899,621; 4,923,254; 4,930,610; 4,979,783; 4,989,703; 5,046,997; 5,069,657; 5,085,102; 5,092,437; 5,179,868; 5,183,138; 5,203,616; 5,269,195; 5,295,412; 5,348,518; 5,365,804; 5,366,053; 5,381,878; 5,389,047; 5,397,282; and 5,404,975.

DISCLOSURE OF INVENTION

The present invention generally relates to a park mechanism for an automotive transmission, and more particularly to an annular parking gear structure which is coextensive with a drive-train output shaft of an automotive transmission.

More specifically, the present invention includes a non-rotatable annular lock ring structure having an integral set of park pawls or teeth for engaging receptacles or teeth formed in a rotating lock ring which is splined to an output shaft of the vehicle. The annular lock ring structure is spring-biased into engagement with the receptacles of the rotating lock ring. A hydraulic or other fluid pressure system moves the annular lock ring to a disengaged position during vehicle operation by directing fluid pressure toward or against one or more pistons formed in the lock ring structure and received in hydraulic chamber(s) provided in the transmission case. In accordance with the invention, when the transmission is placed in the "park" position, a feature of the control valve vents the hydraulic chamber(s) into which the pistons are received to a transmission sump, thereby reducing chamber pressure. This enables the stationary lock ring structure to move axially under the force of a spring or springs to a position in which the pawl teeth engage with the rotating lock ring receptacles or teeth. When the control valve is in any position other than the "park" position, the pressure is directed to the pressure chamber(s), thereby counteracting the spring force and disengaging the pawl teeth from the locking position within the rotating lock ring structure, thereby permitting rotary operation of the output shaft.

Therefore, it is a primary object of the present invention to provide a park mechanism for an automotive transmission.

It is an additional object of the present invention to provide a park mechanism for an automotive transmission, wherein hydraulic or other fluid pressure is utilized to disengage pawl teeth from a locking position, thereby freeing the vehicle for movement.

It is an additional object of the present invention to provide a park mechanism for an automotive transmission, wherein lack of hydraulic or other fluid pressure is utilized to engage pawl teeth in a locking position, thereby preventing movement of the vehicle.

It is an additional object of the present invention to provide a park mechanism for an automotive transmission, wherein an annular lock ring structure is spring-biased into engagement with receptacles or teeth of a rotatable lock ring structure.

The above and other objects, and the nature of the invention, will be further understood by reference to the following detailed description, the accompanying drawings, and the appended claims.

BRIEF DESCRIPTION OF THE DRAWINGS

The sole FIGURE in this application is a cross-sectional view of a park mechanism for an automotive transmission in accordance with the present invention.

BEST MODE FOR CARRYING OUT THE INVENTION

The invention will now be described in more detail, with reference to the FIGURE of the drawings, which is a cross-sectional view of the park mechanism for an automatic transmission in accordance with the present invention.

As seen in the FIGURE, the park mechanism 10 is employed in a transmission case 12, the latter being located around or displaced from an output shaft (indicated by the center line 14 thereof). As further seen in the FIGURE, the park mechanism 10 comprises the following elements: non-rotatable annular lock ring structure 16 which incorporates pawl ring 18, pawl teeth 20, piston 32, splines 36 and two-piece tailstock 38; a rotating lock ring structure 22 which incorporates splines 24 and receptacles or teeth 26; a spring mechanism 28; and pressure chamber 30. The two-piece tailstock 38 serves as a means for implementing the invention in an existing transmission but is not essential to the invention in that the invention could be implemented in a new single-piece transmission.

More particularly, the park mechanism 10 includes a non-rotatable annular lock ring structure 16 having an integral set of park pawl teeth 20 for engaging receptacles 26 in the rotating lock ring structure 22, the rotating lock ring structure 22 being splined to the output shaft (indicated by center line 14 in the FIGURE) of the automotive transmission via splines 24 provided on surface of the rotating lock ring structure 22. In this regard, a mechanism for fixing the lock ring structure 22 in a position of engagement to the output shaft must be provided. For that purpose, a shoulder/lock ring combination, a pair of lock rings, or any other mechanism known to those of skill in the art can be employed.

The annular lock ring structure 16 is spring-biased, via spring mechanism 28, into engagement, via pawl teeth 20, with the receptacles or teeth 26 of the rotatable lock ring structure 22. Similarly, the piston 32 positioned in hydraulic chamber 30 is spring-biased, via spring mechanism 28, to a rightmost position within chamber 30, as indicated by the arrow A in the FIGURE.

The annular lock ring structure 16 is returned to a "disengaged" position during vehicle operation as a result of introduction of fluid pressure into chamber 30 so as to cause the piston 32 to move toward the left (in a direction opposite to the arrow A in the FIGURE), thereby moving the lock ring structure 16 to the left and disengaging pawl teeth 20 from the receptacles or teeth 26 in rotating lock ring structure 22.

It should be noted, that whereas a single piston 32 is shown in the FIGURE, a plurality of pistons could be utilized in the lock ring structure 16 without departing from the spirit and scope of this disclosure. It should also be noted that splines 36 mechanically engage ring 16 with the transmission case so as to prevent rotation.

In accordance with the present invention, when the automotive transmission is placed in the "park" position, chamber 30 containing piston 32 is vented to a transmission sump (not shown), thereby reducing fluid pressure within the chamber 30, and thereby enabling the piston 32 and the non-rotatable annular lock ring structure 16 connected thereto to move to the right, as indicated by the arrow A in the FIGURE. As a result of this movement, pawl teeth 20 are moved into engagement with receptacles or teeth 26, thereby engaging the lock ring structure 16 with the rotating lock ring structure 22.

When any position other than the "park" position is assumed by the vehicle, the pressure is directed into chamber 30, thereby counter-acting the spring force of spring mechanism 28. Thus, piston 32 and its associated lock ring structure 16 are moved to the left (that is, in a direction opposite to the arrow A in the FIGURE), and the teeth 20 are withdrawn from receptacles or teeth 26, thereby disengaging lock ring structure 16 from rotating lock ring structure 22. Accordingly, rotary operation of the output shaft (indicated by center line 14 in the FIGURE) is permitted, and corresponding movement of the vehicle is also permitted.

The present invention can be used with a conventional automatic transmission or with a power-shift automotive transmission, in which case a source of fluid pressure is readily available from the transmission itself. The invention can also be used with a manual transmission, in which case the engine oil pressure can be used as the pressure source. Implantation of the invention would require the provision of the necessary passage or interconnection between the source of fluid pressure and the chamber 30, as well as use of a control valve for relieving pressure when in "park" and pressurizing when not in "park".

While preferred forms and arrangements have been shown in illustrating the invention, it is to be understood that various changes and modifications can be made without departing from the spirit and scope of this disclosure.

I claim:

1. A park mechanism for mechanically locking an output shaft of a transmission, comprising:

a rotatable lock ring structure adapted to be connected to said output shaft and having an engagement portion;

a non-rotatable lock ring structure positioned in proximity to said rotatable lock ring structure and having a locking element engageable with said engagement portion of said rotatable lock ring structure; and moving means connected to said non-rotatable lock ring structure and responsive to the application of fluid pressure thereto for moving said non-rotatable lock ring structure to a disengaged position for non-engagement with said rotatable lock ring structure, said moving means being responsive to the release of fluid pressure therefrom for moving said non-rotatable lock ring structure to an engaged position for engagement with said rotatable lock ring structure;

wherein said locking element is displaced from said engagement portion when said non-rotatable lock ring structure is in the disengaged position, and wherein said locking element positively engages and mechanically locks said engagement portion over a substantial axial travel of said locking element relative to said engagement portion when said non-rotatable lock ring structure commences movement into the engaged position.

2. The park mechanism of claim 1, wherein said moving means comprises a chamber and at least one piston disposed in said chamber and connected to said non-rotatable lock ring structure.

3. The park mechanism of claim 2, wherein said moving means further comprises a spring mechanism position in proximity and connected to said at least one piston for spring-biasing said at least one piston and said non-rotatable lock ring structure into the engaged position.

4. A park mechanism for locking an output shaft of a transmission comprising:

a rotatable lock ring structure adapted to be connected to said output shaft;

a non-rotatable lock ring structure positioned in proximity to said rotatable lock ring structure and engageable with said rotatable lock ring structure; and moving means connected to said non-rotatable lock ring structure and responsive to the application of fluid pressure thereto for moving said non-rotatable lock ring structure to a disengaged position for non-engagement with said rotatable lock ring structure, said moving means being responsive to the release of fluid pressure therefrom for moving said non-rotatable lock ring structure to an engaged position for engagement with said rotatable lock ring structure;

wherein said rotatable lock ring structure comprises at least one receptacle or tooth, and said non-rotatable lock ring structure comprises at least one tooth receivable in said at least one receptacle or tooth.

5. The park mechanism of claim 4, wherein said moving means comprises a chamber and at least one piston disposed in said chamber and connected to said non-rotatable lock ring structure.

6. The park mechanism of claim 5, wherein said moving means further comprises a spring mechanism positioned in proximity and connected to said at least one piston for spring-biasing said at least one piston and said non-rotatable lock ring structure into the engaged position.

7. A park mechanism for locking an output shaft of a transmission, said output shaft defining an axis of said transmission, said park mechanism comprising:

a rotatable lock ring structure adapted to be connected to said output shaft;

a non-rotatable lock ring structure positioned in proximity to said rotatable lock ring structure and engageable with said rotatable lock ring structure; and moving means disposed radially outwardly of the rotatable lock ring structure relative to said axis, said moving means being connected to said non-rotatable lock ring structure and responsive to the application of fluid pressure thereto for moving said non-rotatable lock ring structure to a disengaged position for non-engagement with said rotatable lock ring structure, said moving means being responsive to the release of fluid pressure therefrom for moving said non-rotatable lock ring structure to an engaged position for engagement with said rotatable lock ring structure.

8. The park mechanism of claim 7, wherein said rotatable lock ring structure comprises at least one receptacle or tooth, and said non-rotatable lock ring structure comprises at least one tooth receivable in said at least one receptacle or tooth.

9. The park mechanism of claim 8, wherein said moving means comprises a chamber and at least one piston disposed in said chamber and connected to said non-rotatable lock ring structure.

10. The park mechanism of claim 9, wherein said moving means further comprises a spring mechanism positioned in proximity and connected to said at least one piston for spring-biasing said at least one piston and said non-rotatable lock ring structure into the engaged position.

11. The park mechanism of claim 7, wherein said moving means comprises a chamber and at least one piston disposed in said chamber and connected to said non-rotatable lock ring structure.

12. The park mechanism of claim 11, wherein said moving means further comprises a spring mechanism positioned in proximity and connected to said at least one piston for spring-biasing said at least one piston and said non-rotatable lock ring structure into the engaged position.

* * * * *

UNITED STATES PATENT AND TRADEMARK OFFICE
CERTIFICATE OF CORRECTION

PATENT NO. : 5,695,030
DATED : Dec. 9, 1997
INVENTOR(S) : William E. Medcalf, Jr.

It is certified that error appears in the above-indentified patent and that said Letters Patent is hereby corrected as shown below:

Col. 3, line 50, after "chamber 30" insert --with associated seals 34--.

Col. 4, line 22, after "position" insert --or the engine is turned off--.

Col. 4, line 24, after "(not shown)" insert --or depressurized--.

Col. 4, line 50, change "Implantation" to --Implementation--.

Col. 5, (Claim 3), line 23, change "position" to --positioned--.

Signed and Sealed this

Twentieth Day of October, 1998

Attest:

BRUCE LEHMAN

*Attesting Officer*  *Commissioner of Patents and Trademarks*